Figure 4:
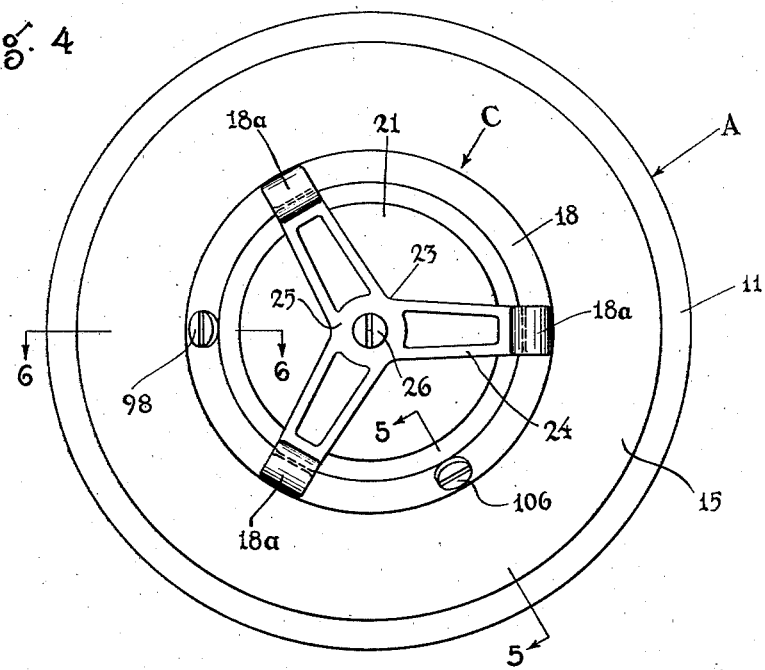

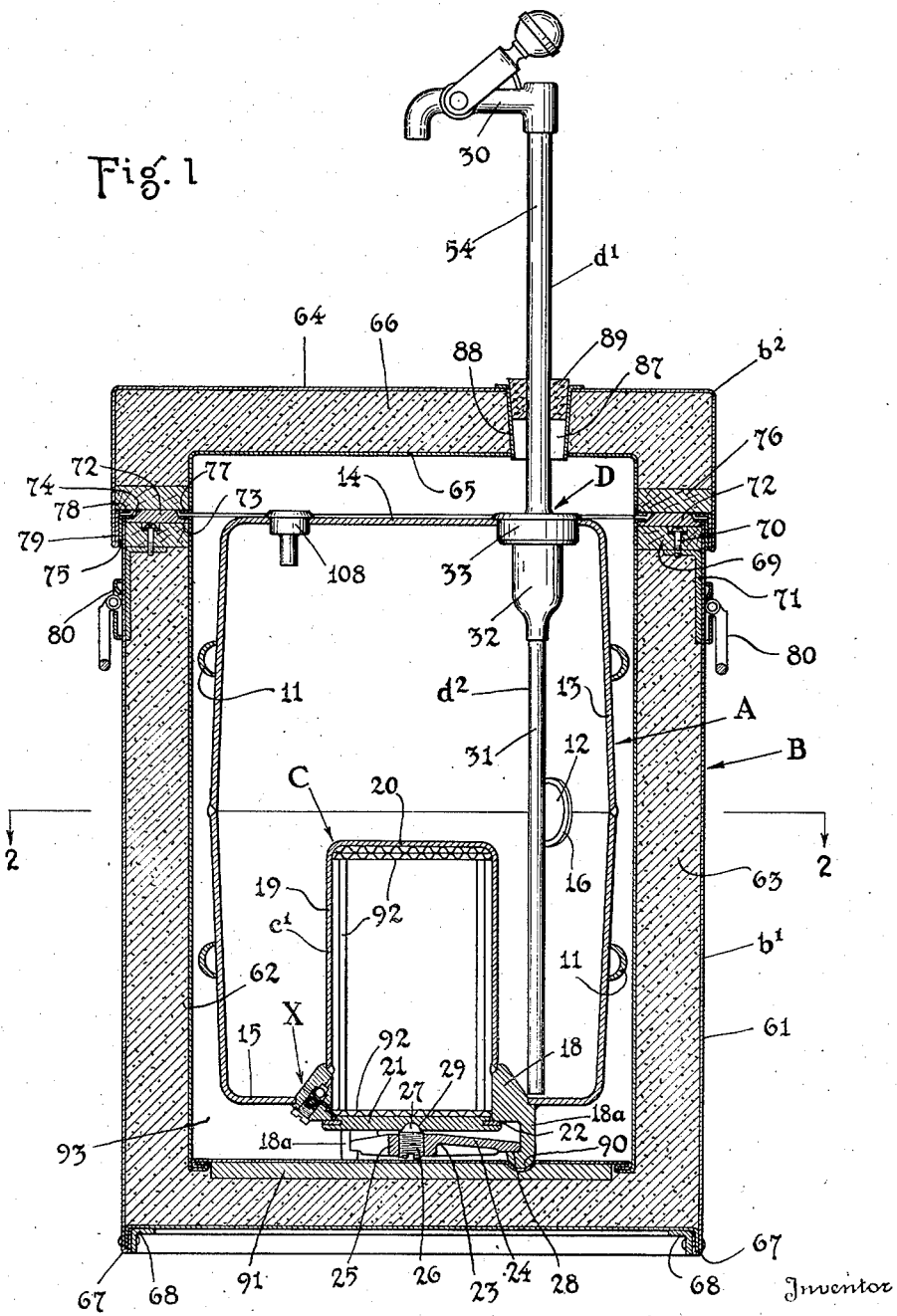

Jan. 4, 1938. G. B. MARZOLF 2,104,466
REFRIGERATING DISPENSER FOR BEVERAGES
Filed Aug. 24, 1933   5 Sheets-Sheet 2
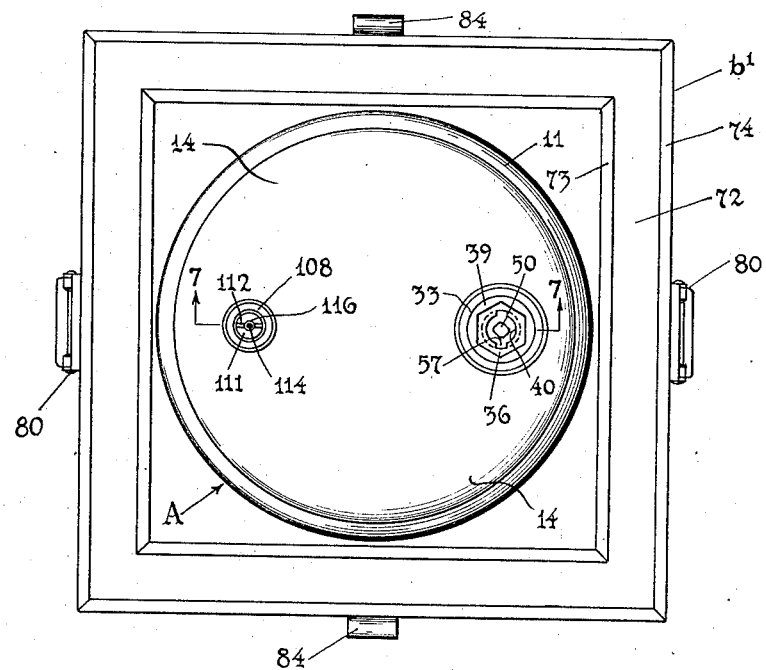
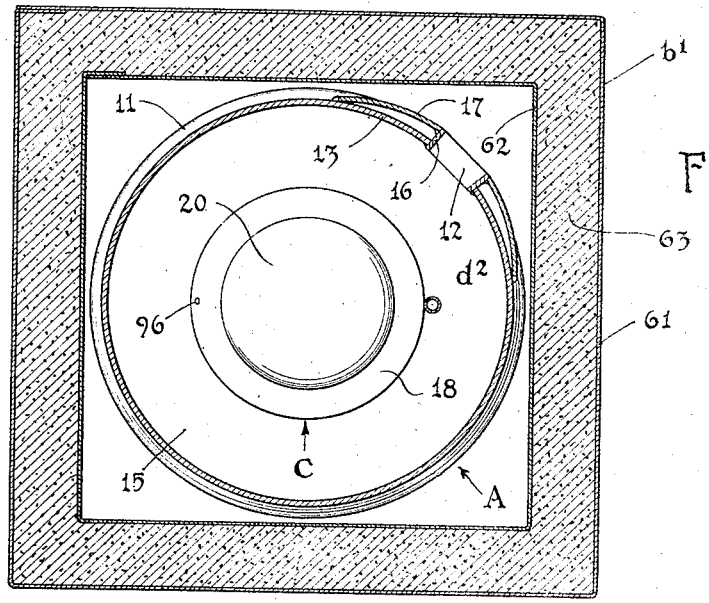
Inventor
George B. Marzolf Jan. 4, 1938.　　　　G. B. MARZOLF　　　　2,104,466
REFRIGERATING DISPENSER FOR BEVERAGES
Filed Aug. 24, 1933　　　5 Sheets-Sheet 3

Inventor
George B. Marzolf
By Caswell & Lagrard
Attorneys

Jan. 4, 1938. G. B. MARZOLF 2,104,466
REFRIGERATING DISPENSER FOR BEVERAGES
Filed Aug. 24, 1933 5 Sheets-Sheet 4
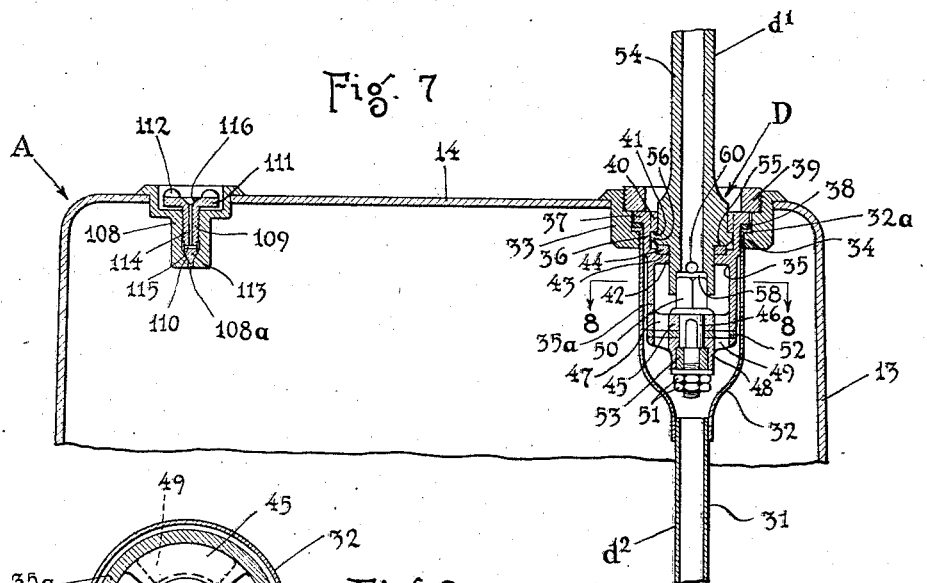
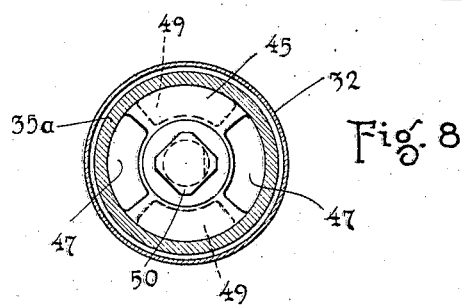
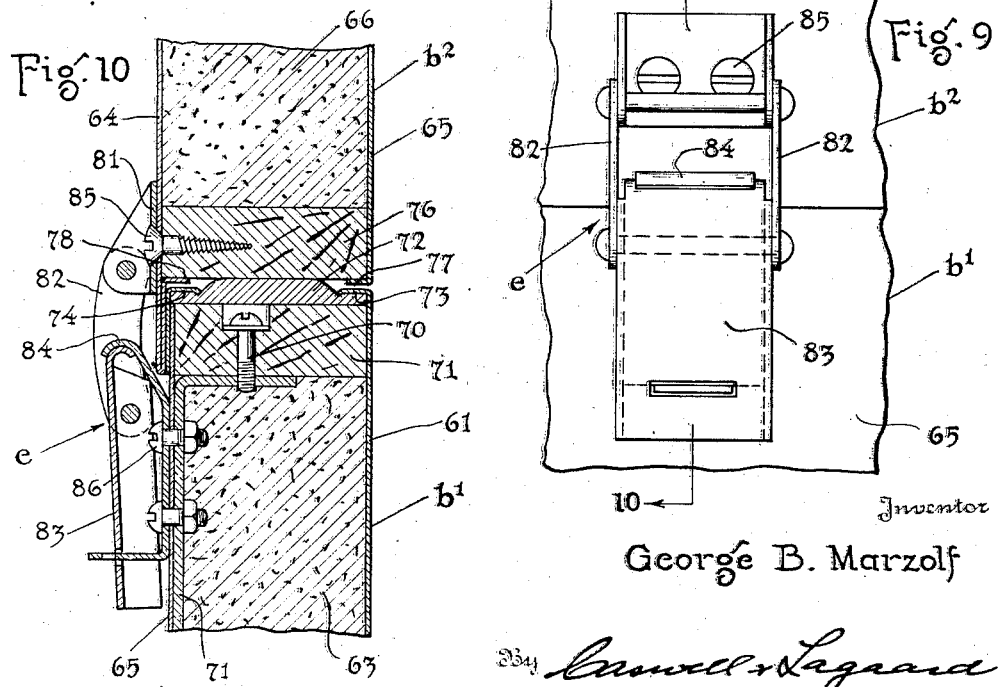
Inventor
George B. Marzolf

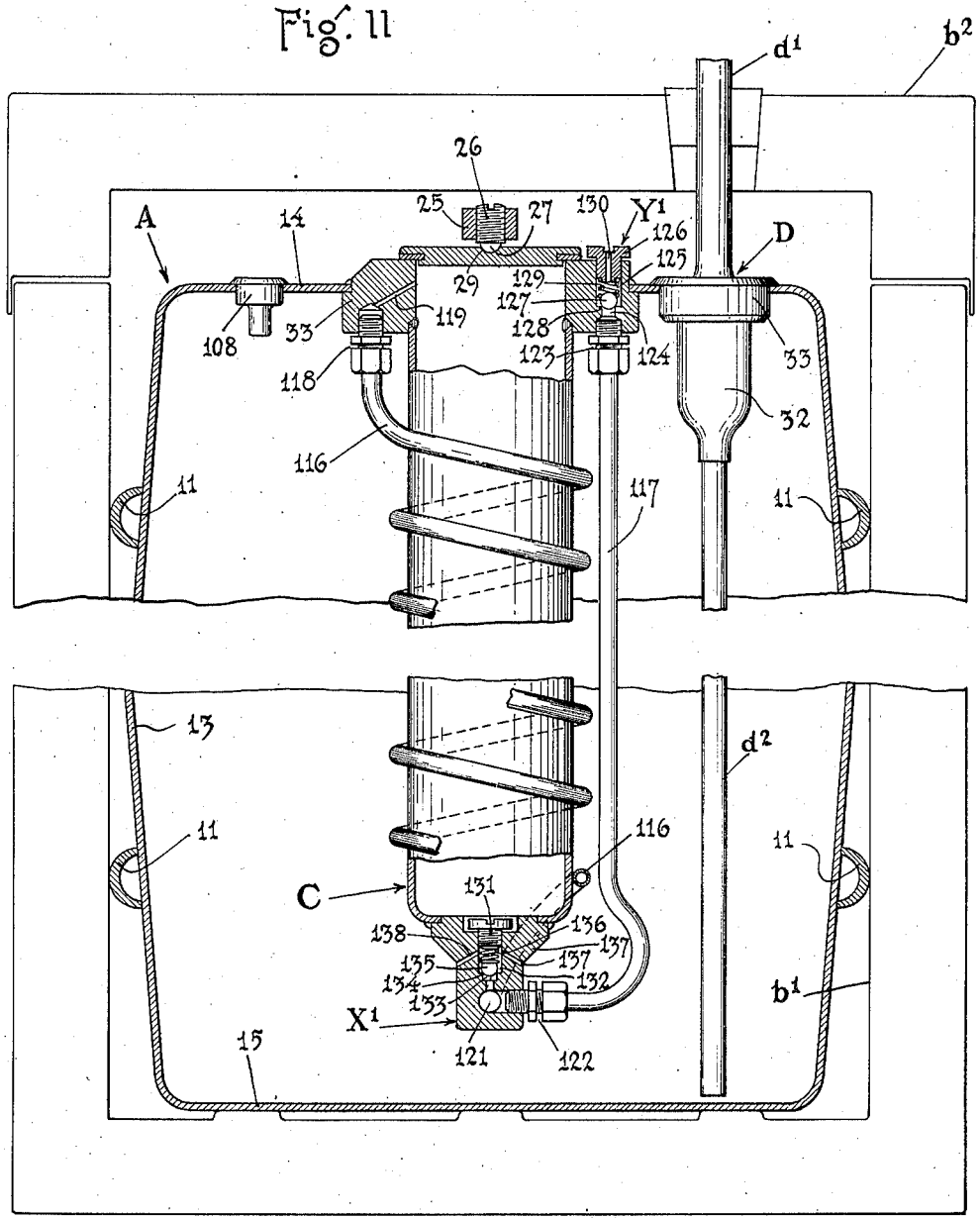

Patented Jan. 4, 1938

2,104,466

UNITED STATES PATENT OFFICE 2,104,466

REFRIGERATING DISPENSER FOR BEVERAGES

George B. Marzolf, St. Paul, Minn., assignor to Farwell Ozmun Kirk & Co., St. Paul, Minn., a corporation of Minnesota Application August 24, 1933, Serial No. 686,544

20 Claims. (Cl. 62—91.5)

My invention relates to improvements in refrigerating dispensers for beverages, particularly carbonated beverages such as beer and the like.

Many persons prefer beer that is dispensed from the keg, barrel or other bulk container, it being well known that beer acquires a distinctive taste in the processing thereof for bottling purposes. Beer not processed to withstand wide variations in temperature and shipped in bulk, as in kegs and barrels, for comparatively prompt consumption is readily perishable and apt to become flat before or during the period in which it is being dispensed. Accordingly, such bulk containers usually leave the brewery in refrigerated condition and are likewise refrigerated in transit and in storage. In dispensing beer from conventional bulk containers, it is desirable, where the necessary equipment is available, to dispense the beer under the pressure of a gaseous carbonating medium in order to keep the beer from becoming flat and lifeless to the taste. Such equipment, though commonly used in public dispensaries, is rarely available in homes and elsewhere not frequented by persons in large numbers to whom the beer is to be dispensed.

An object of my invention is to provide an improved self-contained refrigerating dispenser for beer and like beverages embodying a beverage container and simple and effective means for refrigerating and dispensing the contents thereof.

Another object of the invention is to provide a self-refrigerating container of the present character adapted to employ carbon dioxide as the refrigerating medium, an additional object being to further employ such medium for expelling the contents of the container in the dispensing thereof and also for carbonating the diminishing supply in the container.

A feature of my invention resides in the provision of a container for a liquid to be dispensed which for the purpose of being cooled interiorly has incorporated therein a receptacle for carbon dioxide, the receptacle being vented to conduct gaseous carbon dioxide therefrom into the container, whereby the cooling of the container contents is augmented, and a pressure for expelling the same built up by the carbon dioxide gas.

Another feature of the invention resides in directing the vented gaseous carbon dioxide into the container and through the liquid therein for the purpose of carbonating the liquid, a further feature being in the accomplishment of such result by locating the receptacle at the bottom of the container and venting it directly into the lower portion of the container.

Another feature of the invention resides in the provision of a heat insulating case for the container and in the venting of the excess supply of gaseous carbon dioxide from the receptacle into the case, whereby the container is cooled exteriorly thereof.

To the accomplishment of the foregoing and related ends, the invention, then, consists of the means hereinafter fully described and particularly pointed out in the claims, the annexed drawings and the following description setting forth in detail certain structure embodying the invention, such disclosed structure constituting, however, but one of the various structural forms in which the principle of the invention may be used.

Figure 5:
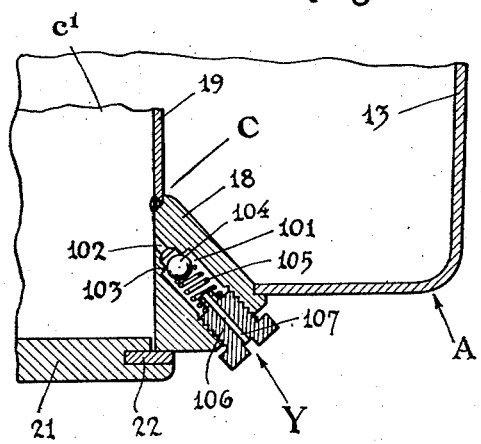
Figure 6:
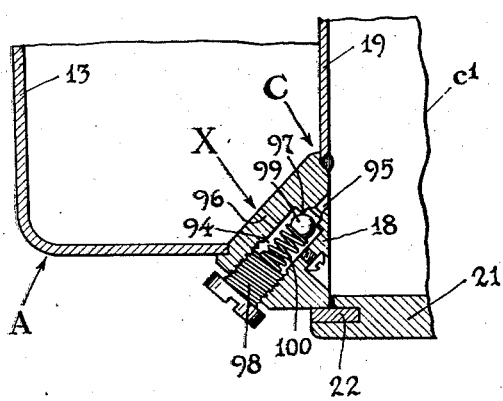

In the accompanying drawings, Fig. 1 is a vertical central sectional view of a construction embodying my invention; Fig. 2 is a plan sectional view taken as on the line 2—2 of Fig. 1; Fig. 3 is a plan view of the case with the cover thereof removed; Fig. 4 is a bottom view of the container; Fig. 5 is a detail sectional view taken as on the line 5—5 of Fig. 4; Fig. 6 is a similar view taken as on the line 6—6 of Fig. 4; Fig. 7 is a detail sectional view taken as on the line 7—7 of Fig. 3; Fig. 8 is a detail sectional view taken as on the line 8—8 of Fig. 7; Fig. 9 is an elevational view of one of the members employed for releasably clamping the cover in place upon the body of the insulating case; Fig. 10 is a detail sectional view taken as on the line 10—10 of Fig. 9; and Fig. 11 is a view similar to Fig. 1 showing an additional construction embodying my present invention.

Reference being had to the drawings, it will be observed that the structure therein illustrated includes a container A and a case B in which the container is removably received and housed.

The container A is preferably constructed of sheet metal in the form of a keg and in size corresponding in capacity with the conventional beverage kegs or other containers. Metal hoops 11 encircling the container at either side of its zone of largest diameter provide means on which the container may be readily rolled in the same fashion as the ordinary keg in the usual handling thereof in the brewery and elsewhere. As in an ordinary keg, a bung 12 is provided in the side wall 13 of the container, midway between the ends 14 and 15 thereof, this construction being followed to meet the requirements of the conventional keg handling, cleansing and filling equipment. The bung 12 is provided by employing a nipple 16 fitted at its smaller end into a hole in the side wall 13 of the container, the nipple being welded to said side wall. For reinforcing the nipple 16 at its outer end and also for bracing the same and providing a guide thereinto is a reinforcing guide plate 17 (Fig. 2) which is curved laterally of the container. An opening in this plate 17 receives the outer end of the nipple 16, said nipple being welded to the plate and said plate being welded to the side wall of the container. A receptacle or capsule C for solidified carbon dioxide is embodied in the container structure axially thereof. This receptacle C includes a cast annular head 18 which is fitted into an opening in the bottom 15 of the container A and welded thereto. A dome-like body member $c^1$ consisting of a cylindrical wall 19 and end 20 of metal and comprising the body of the receptacle C is welded to the inner portion of the annular head 18 and in position within the container, as shown in Fig. 1.

A disk-like closure plate 21, removably clamped against the annular head 18 of the receptacle C, is supplied with a marginal gasket 22, designed to seat against the outer annular surface of the head 18. For securing the closure plate 21 against said annular head 18, a spider clamp 23 is provided. This clamp consists of three arms 24, issuing radially from a central boss 25 in which a screw 26 is axially threaded. Forming bearings for the arms 24 of said spider are three ears 18a formed integrally with the annular head 18, said ears 18a being formed with shoulders 28 against which the extremities of the spider arms bear. The inner end of the screw 26 has a rounded tip 27, adapted to seat in a correspondingly formed depression 29 in the closure plate 21. Backed by the ears 18a, through the spider 23, the screw 26, upon being turned in one direction is brought to bear against the closure plate 21, causing it to be tightly pressed against the head 18 of the receptacle C. Upon being turned in the opposite direction, said screw 26 releases the plate 21, said plate and the spider 23 as well, being thereupon removable from the head 18.

The receptacle C, as previously indicated, is charged with solidified carbon dioxide, the closure plate 21 being removed in an inverted position of the container in the charging operation, and thereafter reapplied to seal the receptacle.

A dispensing conduit D, comprising upper and lower conduit sections $d^1$ and $d^2$, conducts liquid under pressure from the bottom of the container to a valve or faucet 30, incorporated in the upper conduit section $d^1$. In the construction of said sectional conduit D (Figs. 1 and 7), the lower section consists of a tube 31, having an enlarged tubular member 32 at its upper end, said member being formed with an outwardly turned flange 32a at the extremity thereof. This conduit section $d^2$ is received in the bore of a boss 33 fitted in an opening in the end 14 of the container and welded to said end 14. Said boss 33 is formed with an internal annular shoulder 34 providing a seat for the flange 32a of the member 32, as best seen in Fig. 7. Disposed mainly within the said enlarged tubular member 32 is a coupling 35 through which the two conduit sections $d^1$ and $d^2$ are connected, said coupling having valve means incorporated therein and adapted to be actuated by the conduit section $d^1$, when the same is manipulated in connecting it with and disconnecting it from the lower conduit section $d^2$. Said coupling 35 has a substantially tubular body 35a and a head 36 formed with an external flange 37. Except upon being removed to be cleansed or replaced or repaired, the coupling 35 occupies a position within the boss 33 and tubular member 32. In this position of the coupling 35, the flange 37 bears against a gasket 38 which in turn bears against the flange 33 of said tubular member 32. An annular lock-nut 39 threaded externally and fitting internal threads in the boss 33, clamps between it and the shoulder 34 on said boss the said flanges 33 and 37 and the gasket 38, such construction serving rigidly to hold the conduit section $d^2$ and coupling 35 in place and without leakage at the joint between said conduit section $d^2$ and boss 33. The head 36 of the coupling 35 is formed with an internal annular flange 40, providing a shoulder 41, a second internal flange 42 on the body 35a of the coupling 35 providing a second shoulder 43. These shoulders 41 and 43 are spaced apart and face each other, the latter supporting a gasket 44 for a purpose soon to appear. At its lower end the tubular body 35a of the coupling 35 is formed with a web or valve seat 45 (Fig. 8), the central portion of which provides a bearing wherein a valve stem 46 is rotatably mounted, diametrically opposed arcuate portions of said web being cut away to form ports 47. A valve head 48 mounted on and turned by the stem 46 is formed with ports 49 corresponding with the ports 47 in the web 45. A shouldered head 50 on the valve stem 46 bears against the upper face of the web 45, nuts 51 on the lower threaded end of said stem serving to maintain a tight turning fit between the valve head 48 and the lower face of the apertured web 45. The valve head 48 is provided with an apertured facing disk 52 and with a tubular gasket 53 encircling the stem 46 to render the valve structure pressure right. The upper conduit section $d^1$, which consists of a tube or pipe 54, is enlarged at its lower end, an annular shoulder 55 being provided in such construction. Above this shoulder 55 the said enlarged portion of said conduit section $d^1$ is formed with diametrically opposed ears 56 which are received in slots 57 (Fig. 3), formed in the internal flange 40 of the coupling member 35, the upper surfaces of said ears being formed to provide cams for engagement with the shoulder 41 of the internal flange 40. At the extremity of said conduit section $d^1$, the bore therein is enlarged and shaped to provide a socket 58 conforming with the shouldered head 50 of the valve stem 46. Immediately above said socket 58 and for the purpose of bringing said bore into communication with the interior of the coupling member 35, said tubular conduit section $d^1$ is provided with diametrically opposed apertures 60 therein.

In applying the conduit section $d^1$ to the coupling member 35, the lower end thereof is inserted into said member, the ears 56 thereon entering the slots 57 and the socketed extremity thereof fitting over the shouldered head 50 of the valve stem 46. The conduit section $d^1$ is then turned to the right. In thus turning said section, the upper cam surfaces of the ears 56 coact with the shoulder 41 and force the shoulder 55 of said conduit section against the gasket 44. Concurrently therewith, the socketed extremity of said conduit section $d^1$ turns the valve stem 46, bringing the apertures 49 of the valve head 48 into registration with the apertures 47 in the valve seat 45 whereupon communication, under control of the faucet 30, is had with the interior of the container A through the conduit sections $d^2$ and $d^1$. In detaching the conduit section $d^1$, it is first turned to the left to bring the ears 56 back into registration with the slots 57. Concurrently, the valve head 48 is turned into position, obstructing the ports 47 in the valve seat 45 of the coupling member 35. Thus, the valve structure in the coupling member is closed and the conduit section $d^1$ freed for detachment from the container A.

The case B provides a heat insulating enclosure for the container A, said case comprising a body $b^1$, square in cross section, and a removable cover $b^2$ for said body. The body $b^1$ of the case B includes a bottom and side wall portions, the same consisting of an outer shell 61 and an inner shell 62 of sheet metal between which is disposed a suitable heat insulating material 63. Similarly, the cover $b^2$ of the case B includes a top and side wall portions, the same consisting of an outer shell 64 and an inner shell 65 between which insulating material 66 is disposed.

At the base of the body, the construction of the outer shell 61 provides a depending flange 67, a reinforcing angle 68 being arranged internally of said flange. At the rim of the body $b^1$ is a moulding 69 of wood or other suitable material, the same being secured by screws 70 to a reinforcing angle 71 within the outer shell 61. Resting on the moulding 69, is a dividing strip 72 of rubber or the like, the inner margin of said strip being caught beneath a flange 73 turned outwardly from the inner shell 62 and the outer margin of said strip being caught beneath a flange 74 on a finishing angle 75 extending around the body $b^1$. The cover $b^2$ also has a moulding 76 of wood or the like at the rim thereof. This moulding 76 bears against the dividing strip 72 on the body $b^1$ and is held in place by flanges 77 and 78 turned on the inner and outer shells 61 and 62 respectively, of said cover. In forming the outer shell 64 of the cover $b^2$, the sheet metal is bent back upon itself to provide a depending flange 79 which telescopes the upper portion of the body $b^1$ and holds the top $b^2$ against lateral movement on said body. Handles 80, arranged at opposite sides of the body $b^1$, and suitably secured to the reinforcing angle 71, provide for conveniently handling the case B with or without the container A therein. Releasable cover clamps $e$ removably secure the cover $b^2$ in place upon the body $b^1$ of the case B, a suitable form of clamp being shown in detail in Figs. 9 and 10. Essentially, this form of clamp includes a bracket 81 fastened to the cover $b^2$. It also includes a pair of links 82 pivoted to said bracket 81 and a lever 83 carried by said links and adapted to be engaged with and disengaged from an abutment member 84 anchored to the body $b^1$ of the case. As shown, the brackets 81 are secured to the cover of the case by means of screws 85 threaded into the moulding 76 in said cover and the abutment members 84 are anchored to the body $b^1$ of the case by means of bolts 86 passing through the reinforcing angle 71 in the body $b^1$.

The cover $b^2$ of the case has an opening 87 therein provided by arranging a tapered nipple 88 in the top of said cover. With the container A disposed within the case B as shown in Fig. 1 and with said cover $b^2$ in place on the body $b^1$ of the case, the conduit section $d^1$ may be inserted through said nipple 88 and into the coupling member 35 in the container A. A stopper 89, slidably carried on the conduit section, fits into the nipple 88 and not only seals the opening therein about said conduit section, but also braces said section through the cover $b^2$. In the inner shell 62 at the bottom of the body $b^1$ of the case, indentations 90 are formed. These indentations receive the ears 27 upon which the container A stands. In one of three angular positions of the container, relative to the case B, the seating of said ears in said indentations aligns the coupling member 35 of the container with the opening 87 in the cover $b^2$. Thus, the proper angular relation between container and case is readily obtained. The bottom of the inner shell 62, upon which said container A stands, is reinforced by a stiff panel 91 of wood or other suitable material.

The receptacle C is provided with an insulating lining 92, the thickness and character thereof being such as to suitably control the "melting" of the solidified carbon dioxide with which said receptacle is charged. This receptacle has two vents X and Y for the escape of the gaseous carbon dioxide into which the "melting" solid is converted as it absorbs heat from the liquid about the receptacle. Vent X conducts gaseous carbon dioxide from the interior of the receptacle C into the interior of the container A at the bottom thereof. Vent Y conducts gaseous carbon dioxide from the interior of the receptacle C to the outside of the container and into the space 93 between the exterior of the container and the inner shell of the case B. In providing said first vent X (Fig. 6), a bore 94 is formed in the cast head 18 of the receptacle C, said bore opening at the exteriorly exposed portion of said head. Communicating with each other through said bore 94 and bringing the interior of the receptacle C into communication with the interior of the container A, are two smaller bores 95 and 96, the former being a reduced extension of the bore 94 opening into said receptacle and the latter being a bore formed at right angles to the bore 94 and opening into the container. At the junction between the bores 94 and 95, a ball seat 97 is provided, the outer end of the bore 94 being threaded internally to receive a screw 98. A ball check 99 is yieldingly held against the ball seat 97 by means of a coiled spring 100 interposed between said ball check 99 and the inner end of the screw 98, said spring being adapted to be adjustably tensioned upon the turning of said screw 98. The second vent Y (Fig. 5) is similar to said first vent X, the same being provided with a large bore 101, a small bore 102 extending from bore 101 and opening into the interior of the receptacle C, a ball seat 103 at the junction of the bores 101 and 102, a ball check 104 held against said seat by a spring 105, and a screw 106 forming an abutment for said spring, said screw being threaded into the bore 101. In said second venting structure an egress bore 107 is formed in the screw 105 so that gaseous carbon dioxide exhausted from the receptacle C, past the ball check 104, will be directed to the exterior of the container and into the space 93 in case B surrounding the container A.

In the top wall or end 14 of the container A is a third vent (Fig. 7) provided by the employment of a valve body 108, having a needle valve 109 therein. The valve body 108 is fitted into an opening in the end 14 of the container and welded thereto, said body having a bore 108a therein communicating with the interior of said container, the upper portion of said bore being threaded internally and the lower portion thereof being reduced and formed to provide a tapered valve seat 110. The stem of the needle valve 109 is threaded into the threaded bore of the valve body 108. Said needle valve includes a head 111 formed with finger pieces 112 thereon, the extremity of said stem being tapered as at 113 and adapted to bear against said tapered seat 110. A bore 114 longitudinally of the valve 109 communicates with a bore 115 transversely thereof, said bores 114 and 115 serving through the bore 108a in the valve body 108 to bring the interior of the container A into communication with the outside, when the valve 109 is unseated from the valve seat. A conical depression 116 in the head 111 of the needle valve 109 is provided to accommodate a ball tip of a pump or other nozzle for introducing air or other gas into the container A under pressure.

In use and with the conduit section $d^1$ detached therefrom, the container A is filled, the same being handled in the ordinary manner while being filled, and a plug finally driven in the bung 12 as the last step in the filling process. When the container A is to be delivered, the receptacle C is charged, such procedure being attended with the removal of the closure plate 21, the insertion into the receptacle C of a quantity of solidified carbon dioxide and the reapplication of said closure plate 21.

The container A is then placed in the body $b^1$ of the case B, together with the conduit section $d^1$ which is readily accommodated in a corner of said body $b^1$. The cover $b^2$ is applied to the body $b^1$ of the case, with the opening 87 in said cover plugged with a suitable stopper. The dispenser is then ready for delivery.

Solid carbon dioxide has a temperature of about 110° below zero. Upon "melting", it passes directly into a dry gaseous state of substantially the same low temperature, the gas in volume being about five hundred times that of the solid. In charging the receptacle C with solid carbon dioxide, the quantity thereof employed, the amount of insulation 92 used in lining the receptacle, the quantity and character of container contents and the time estimated for delivery of the container and for the dispensing of its contents are all inter-dependent factors for the consideration of the packer who, accordingly, uses the appropriate insulation in the receptacle and the appropriate quantity of the solid carbon dioxide. With the body or dome $c^1$ of the charged receptacle immersed in the liquid in the container, a process of heat exchange is set up between the liquid and the solid carbon dioxide, which results in the "melting" of the latter or, in other words, the changing thereof from a solid state to a gaseous state. The relatively great quantity of gas generated from the "melting" solid escapes under its own acquired pressure from the receptacle C, one avenue of escape being through the vent Y shown in Fig. 5. Escaping through this vent Y, the gas enters the space in the case B about the container A and thence leaks through the joints in said case to the outer atmosphere, such gas within said space 93 serving to cool the container exteriorly at all sides thereof in addition to the cooling effect provided by the solid and the gas within the receptacle C.

The metallic keg-like container A is preferably formed from sheet metal. The hoops 11 on said container, being shell-like and of metal, are also preferably formed from sheet material. These hoops 11 serve purposes other than that of reinforcing the container structure and providing means on which the container may be rolled. They constitute spaced annular ribs which contact the inner walls of the case B and center the container therein. Said hoops 11 also provide hand holds for the container by which it may be lowered into the case and lifted from the case, ample hand and arm room being afforded in the reentrant angles of the case.

Upon the delivery of the dispenser and at such time as the liquid therein is to be dispensed, the user removes the cover $b^2$ from the body $b^1$ of the case B and also removes the stopper from the opening in the cover. After taking the conduit section $d^1$ from the case, the cover $b^2$ is reapplied. The lower end of the conduit section $d^1$ is then inserted through the opening 87 in the cover $b^2$ and thence into the coupling 35. Said conduit section $d^1$ is then turned to complete its connection with the lower section $d^2$ and to open the valve 48 in the coupling 35. The tapping of the container A being thus effected, the stopper 89 on the conduit section $d^1$ is then slipped downwardly thereon tightly to close the opening 87 in the cover $b^2$.

The faucet 30 is used in the ordinary manner to dispense the liquid. The springs 100 and 105, acting upon the ball checks 99 and 104 in the vents X and Y are relatively adjusted so that the avenue of least resistance for the escape of gas from the receptacle C is through the vent X and into the liquid in the container. With said check springs properly adjusted, a predetermined pressure, by the admission of gas to the container, is built up and maintained within said container, the same serving to force the liquid from the container and through the conduit D when the faucet 30 is opened. Thus, substantially the entire contents of the container A may be drawn therefrom under the control of the faucet, the liquid at all times being refrigerated due to the cooling effect of the solid and gaseous carbon dioxide within the receptacle and the like effect of the gas exteriorly of the container and due further to the like effect of the gas bubbling through the liquid and replacing at the top of the container the liquid that is drawn therefrom. In addition to cooling the liquid in passing upwardly therethrough and in occupying the space thereabove, under pressure, the gaseous carbon dioxide carbonates the liquid, keeping it in a desirably carbonated state.

While maintaining a predetermined pressure within the container A and for the purpose of increasing the carbonating and/or cooling action of the gas in the liquid, the container A may be vented at the top thereof by cracking the valve 109 and thereby increasing the flow of gas through the liquid. This use of the valve 109 is advantageous in that the liquid in the container can be actively subjected to the carbonating gas without drawing off any of the liquid. Thus, such liquid, if flat, may be carbonated and rendered fit for use. Said valve 109 may be used further for introducing air or other gas into the container to build up pressure therein for expelling the contents thereof. This use of said valve is advantageous in the event that the charge of carbon dioxide in the receptacle C should become expended before the withdrawal of the entire contents and especially when additional carbon dioxide is not available.

In the form of dispenser shown in Fig. 11, the construction is essentially similar to that of the form shown in Fig. 1, the same having numerous parts identical to those shown in Fig. 1 and bearing the same reference characters.

In said Fig. 11, the receptacle C is illustrated as being embodied in the end or top 14 of the container A. Instead of venting gaseous carbon dioxide from the receptacle C through the independent vents, one discharging gas into the interior of the container A and the other discharging gas exteriorly of said container, the gas passes in its entirety from the upper portion of the receptacle C into a pipe section 116 coiled about the receptacle C and leading to the bottom thereof where it connects with a venting structure $X^1$. Leading upwardly from said venting structure $X^1$, a second section 117 connects with a second venting structure $Y^1$, incorporated in the head 33 of the receptacle C. The upper end of the pipe section 116 is anchored to the head 33 of the receptacle C through a compression fitting 118 and communicates with the interior of said receptacle through a bore 119 in said head. The lower end of said pipe section 116, through a fitting similar to the fitting 118 is anchored to a block 120 incorporated in the bottom of the receptacle C and constituting the body of the venting structure $X^1$, said block being formed with a bore 121 therein, with which said pipe section 116 communicates. Pipe section 117, anchored to the block 120 by a fitting 122, communicates with the pipe section 116 through said bore 121, the upper end of said pipe section 117 being anchored to the annular head 33 of the receptacle C by a compression fitting 123 and brought into communication therethrough with a reduced extension 124 of a bore 125 formed in said head 33. Included in the venting structure $Y^1$ is a screw 126 which is threaded in the bore 125. A ball check 127, seated against an annular seat 128 provided between said bore proper and its reduced extension 124, is yieldingly held against said seat 128 by means of a coiled spring 129 interposed between said ball check and said screw, the latter being adjustable to vary the tension of said spring. An axial bore 130 formed in the screw 126, provides a passageway to the exterior of the container for the gas which unseats and passes the ball check 127.

The venting structure $X^1$ includes a screw 131 which is threaded in a bore 132 formed in the block 120, the head of said screw being accessible interiorly of the receptacle C. A reduced extension 133 of said bore 132 communicates with the bore 121 in said block through which the two pipe sections 116 and 117 communicate. Cooperating with an annular seat 134 formed at the junction between said bore 132 and the extension 133 thereof is a ball check 135, the same being yieldingly held against said seat by means of a coiled spring 136 interposed between said ball check 135 and said screw 131. At points above the ball check 135, the bore 132 is brought into communication with the interior of the container C through bores 137 and 138 formed in the block 120, said bores serving to vent gas from the venting structure $X^1$ into the liquid in the container. The springs 129 and 136 in the venting structures $X^1$, $Y^1$, are relatively adjusted so that the gas in the conduit structure (116, 117) meets less resistance in unseating the ball check 138 than in unseating the ball check 127. Thus, the gas maintains a certain internal pressure within the container C, depending upon the adjustment of the screw 126 in the venting structure $Y^1$, such of the gas as may be accommodated entering the interior of the container C through the venting structure $X^1$ and not only refrigerating and carbonating the contents of the container, but also supplying pressure for discharging the same from said container. The final venting of the gas through the venting structure $Y^1$ is permitted only after the gas has passed through the pipe sections 116 and 117, both of which are submerged in the liquid contents of the container. This feature provides for the maximum utilization of the gas for refrigerating purposes interiorly of said container C.

I claim:

1. A self-contained device for refrigerating and dispensing liquids under pressure, the same comprising a closed liquid container, a heat insulating case adapted to receive said container and provide an enclosed space about the same, said case being formed with an opening therein at the top thereof, said container having a conduit coupling member, a valved tapping conduit for conducting liquid from the container, said conduit being adapted to be inserted through the opening in said case and to cooperate with said coupling member, a receptacle for solid carbon dioxide incorporated within the container structure, said receptacle including an annular head fitted in an opening in the bottom of the container, said receptacle further including a dome-like member within the container joined to said annular head and a closure plate for said head, ears projecting from said head and providing legs for supporting the container in the case with the bottom of said container spaced from the bottom of the case, clamping means for the closure plate adapted to coperate therewith and with said ears, the bottom of the case having guide means for cooperation with said ears to assist in positioning the container angularly within the case to dispose the conduit coupling member in the container in definite relation with respect to the conduit receiving opening in the case, said head having two vents therein for conducting carbon dioxide gas from the receptacle, one vent leading into the interior of the container and the other leading to the exterior of the container and into the space between the bottom thereof and the bottom of the case, said second vent controlling the passage of gas therethrough to maintain the carbon dioxide gas within said container under the pressure desired for discharging the liquid therefrom through said conduit.

2. A self-contained device for refrigerating and dispensing liquids under pressure, the same comprising a closed liquid container, a heat insulating case adapted to receive said container and provide an enclosed space about the same, said case being formed with an opening therein at the top thereof, said container having a conduit coupling member, a valved tapping conduit for conducting liquid from the container, said tapping conduit being adapted to be inserted through the opening in said case and to cooperate with said coupling member, a receptacle for solid carbon dioxide incorporated within the container structure, said receptacle including an annular head fitted in an opening in the bottom of the container, said receptacle further including a dome-like member within the container joined to said annular head and a closure plate removably applicable to said head externally of the container for closing said receptacle, ears projecting from said head and providing legs for supporting the container in the case with the bottom of said container spaced from the bottom of the case, said head having two vents therein for conducting carbon dioxide gas from the receptacle, one vent leading into the interior of the container and the other leading to the exterior of the container and into the space between the bottom thereof and the bottom of the case, said second vent controlling the passage of gas therethrough to maintain the carbon dioxide gas within said container under the pressure desired for discharging the liquid therefrom through said conduit.

3. A self-contained device for refrigerating and dispensing liquids under pressure, the same comprising a closed liquid container, a heat insulating case adapted to receive said container and provide an enclosed space about the same, a valved conduit extending from said container through said case and through the space between container and case for drawing liquid from the container, a receptacle for solid carbon dioxide, said receptacle including an annular head fitted in an opening in one end of the container, said receptacle further including a receptacle body portion within the container and a closure plate removably applicable to said head, externally of the container, for closing said receptacle, an insulating receiver for solid carbon dioxide removably disposed within the receptacle, said receiver permitting the gas from the solid carbon dioxide to pass therefrom into contact with the inner walls of said receptacle, said head having two vents therein for conducting carbon dioxide gas from the receptacle, one vent leading into the interior of the container and the other leading to the exterior of the container and into the space between said container and case, said second vent controlling the passage of gas therethrough to maintain the carbon dioxide gas within said container under the pressure desired for discharging the liquid therefrom through said conduit.

4. In a dispenser of the character described, a closed container for a liquid, a heat insulating case adapted removably to receive said container on end and provide an enclosed space about the sides and one of the ends of the container, a closed receptacle for carbon dioxide incorporated in the structure of such end of said container and within the same, said receptacle having a vent therein for conducting gaseous carbon dioxide into the interior of the container and having a second vent therein for conducting gaseous carbon dioxide into the space within said case at the end of the container in which said receptacle is incorporated, said vents having check means therein, the check means in said second vent offering such resistance to the flow of the gas therethrough as to maintain a predetermined liquid dispensing pressure within the container, and a valved tapping conduit removably applicable to the container through said case for dispensing the liquid under pressure from said container.

5. A self-contained device for refrigerating and dispensing liquids under pressure, the same comprising a closed liquid container having a conduit coupling member, a heat insulating case including a body and a removable cover, said case being adapted to receive said container and provide an enclosed space about the same, said cover being formed with an opening therein, a valved tapping conduit for conducting liquid from the container, said conduit being adapted to be inserted through said opening in said cover and to cooperate with said coupling member, means within said opening providing a seal between cover and conduit and serving to brace said conduit, a closed receptacle for solid carbon dioxide incorporated within the container structure and having two vents, one leading from the interior of the receptacle to the interior of the container and the other leading from the interior of said receptacle into the space between said container and case.

6. A self-contained device for refrigerating and dispensing liquids under pressure, the same comprising a closed liquid container having a conduit coupling member, a heat insulating case adapted removably to receive said container and provide an enclosed space about the same, said case being formed with an opening therein, a valved tapping conduit for conducting liquid from the container, said tapping conduit being adapted to be inserted through the opening in said case and to cooperate with said coupling member, means within said opening providing a seal between case and conduit and serving to brace said conduit, a closed receptacle for solid carbon dioxide incorporated within the container structure and having two vents, one leading from the interior of the receptacle to the interior of container and the other from the interior of the receptacle to the space between container and case.

7. A self-contained device for refrigerating and dispensing liquids under pressure, said device comprising a closed liquid container, an insulated case to which the container is removably applicable, said case providing an enclosed space about the container, a valved tapping conduit removably applicable to the container through said case, a receptacle for solid carbon dioxide incorporated within the container structure and having a removable closure plate constituting a wall of said receptacle, said plate, when in place, being exposed to the space between container and case, an insulating receiver for solid carbon dioxide removably applicable to said receptacle, said receiver permitting the gas from the solid carbon dioxide to pass therefrom into contact with the inner surfaces of the walls of said receptacle, said receptacle having two vents therein for conducting gas therefrom, one vent leading through a wall of the receptacle directly into the interior of the container and the other leading through a wall of the receptacle to the exterior of the container and into the space between container and case, said second vent controlling the passage of gas therethrough to maintain the carbon dioxide gas within said container under the pressure desired for discharging the liquid therefrom through said conduit.

8. A self-contained device for refrigerating and dispensing liquids under pressure, said device comprising a closed liquid container, a valved conduit for conducting liquid therefrom, a receptacle for solid carbon dioxide incorporated within the container structure and having a removable closure, an insulating receiver for solid carbon dioxide removably applicable to the receptacle, said receiver permitting the gas from the solid carbon dioxide to pass therefrom into contact with the inner surfaces of the walls of said receptacle, said receptacle being vented to permit the escape of gas therefrom, there being one vent leading into the interior of the container and another vent leading to the exterior thereof, said second vent controlling the passage of gas therethrough to maintain the carbon dioxide gas within said container under the pressure desired for discharging the liquid therefrom through said conduit.

9. In a dispenser of the character described, a closed container for a liquid, a heat insulating case adapted removably to receive said container on end and provide an enclosed space about the sides, bottom and top thereof, a valved tapping conduit removably applicable to said container through a wall of said case, a closed receptacle for solid carbon dioxide incorporated in the bottom of said container and, in part, immersed in the liquid therein, the wall of said receptacle having a passageway therein leading from said receptacle directly into the container for conducting into the liquid gas produced from the solid "melting" in the receptacle, and a second passageway leading from said receptacle for conducting gas therefrom into the space between the bottom of said container and the bottom of said case.

10. In a self-contained refrigerating dispenser, a heat insulating case, a closed container for a liquid to be dispensed, said case being adapted removably to receive said container and provide an enclosed space about the same, a closed receptacle associated with the container structure, a valved tapping conduit removably applicable to said container through the case for conducting liquid under pressure from said container, said receptacle being adapted to receive solid carbon dioxide in quantity to supply liquid dispensing pressure and refrigeration within the container, also refrigeration for the container externally thereof, a passageway for gaseous carbon dioxide extending from the interior of the receptacle to the interior of the container and a second passageway for gaseous carbon dioxide extending from the interior of said receptacle into the space in said case about said container, said first passageway having check means to obstruct the flow of liquid and gas from the container into said receptacle, and said second passageway having check means adapted to yield to the flow of gas therethrough from the receptacle into the space in said case about said container, the check means in said second passageway being adjustable to provide for the controlled flow of gas therethrough, thereby maintaining any predetermined liquid dispensing pressure of the cooling gas within the container.

11. A self-contained device for refrigerating and dispensing liquids under pressure, the same comprising a closed liquid container having a conduit coupling member, a heat insulating case adapted removably to receive said container and provide an enclosed space about the same, said case being formed with an opening therein, complementary means associated with container and case for relatively disposing the same to align the coupling member of the container with said opening in said case, a valved tapping conduit for conducting liquid from the container, said conduit being adapted to be inserted through the opening in said case and to cooperate with said coupling member, and a closed receptacle for solid carbon dioxide associated with the container structure and vented to the interior of the container and also to the space between container and case.

12. A self-contained device for refrigerating and dispensing liquids under pressure, the same comprising a closed liquid container having a conduit coupling member, a heat insulating case adapted removably to receive said container and provide an enclosed space about the same, said case being formed with an opening therein, said container being adapted to occupy a position within the case, wherein the container coupling is aligned with said opening in said case, a valved tapping conduit for conducting liquid from the container, said conduit being adapted to be inserted through the opening in said case and to cooperate with said coupling member, and a closed receptacle for solid carbon dioxide associated with the container structure and vented to the interior of the container and also to the space between container and case.

13. A self-contained device for refrigerating and dispensing liquids under pressure, said device comprising a closed liquid container, a valved conduit for conducting liquid therefrom, a receptacle for solid carbon dioxide incorporated within the container structure and having a removable closure wall, an insulating receiver for solid carbon dioxide removably applicable to the receptacle, said receiver permitting the gas from the solid carbon dioxide to pass therefrom into contact with the inner surfaces of the walls of said receptacle, the receptacle being vented into the interior of the container for conducting gaseous carbon dioxide thereinto and also vented to the exterior of the container for releasing such gaseous carbon dioxide to the outside, the second vent offering resistance to the passage of gas therethrough, whereby the container is constantly charged with gas under liquid dispensing pressure.

14. In a dispenser of the character described, a closed container for a liquid, a heat insulating case adapted removably to receive said container on end and provide an enclosed space about the sides and one of the ends of the container, a closed receptacle for solid carbon dioxide incorporated within the container in the structure of such end thereof, said receptacle being vented into the interior of the container for releasing gaseous carbon dioxide thereinto, and also vented into said enclosed space at the aforesaid end of said container, said last vent offering resistance to the passage of the gas therethrough, whereby the container is constantly charged with gas under liquid dispensing pressure, and a tapping conduit leading from the interior of the container through said case.

15. In a dispenser of the character described, a closed container for a liquid, a heat insulating case adapted removably to receive said container and provide an enclosed space about the same, a closed receptacle for solid carbon dioxide incorporated within the container in the wall structure thereof, said receptacle being vented into the interior of the container for releasing gaseous carbon dioxide thereinto, and also vented to the outside of the container into said enclosed space about said container, the venting of the gas into said space being attended with resistance to the flow thereof, whereby the container is constantly charged with gas under liquid dispensing pressure, and a tapping conduit leading from the interior of the container through said case.

16. In a dispenser of the character described, a closed container for a liquid, a conduit leading from the interior of the container for dispensing the liquid therefrom, a normally closed receptacle within the container for solid carbon dioxide, a heat insulating receiver within the receptacle for the solid carbon dioxide disposed therein, said receiver permitting the gas to pass therefrom into contact with the inner surfaces of the walls of said receptacle, said receptacle being vented into the interior of the container for releasing gaseous carbon dioxide thereinto, and vented also to the outside, the venting of the gas to the outside of the container being attended with such resistance to the flow thereof as to cause the container to be charged at a substantially constant liquid dispensing pressure by the gas generated from the solid carbon dioxide in the receptacle.

17. In a dispenser of the character described, a closed container for a liquid, a conduit leading from the interior of the container for dispensing the liquid therefrom, a normally closed receptacle within the container for solid carbon dioxide, a heat insulating receiver within the receptacle for the solid carbon dioxide disposed therein, said receptacle being vented into the interior of the container for releasing gaseous carbon dioxide thereinto, and vented also to the outside, the venting of the gas to the outside of the container being attended with such resistance to the flow thereof as to cause the container to be charged at a substantially constant liquid dispensing pressure by the gas generated from the solid carbon dioxide in the receptacle.

18. In a dispenser of the character described, a heat insulating case, a closed container for a liquid, said container being disposed on end within the case, said case providing an enclosed space about the sides and one of the ends of the container, a closed receptacle for solid carbon dioxide incorporated within the container in the structure of such end thereof, said receptacle being vented into the interior of the container for conducting thereinto a portion of the gas generated from the solid carbon dioxide in said receptacle, and also vented into said enclosed space at the aforesaid end of said container for conducting thereinto another portion of such gas, and a tapping conduit leading from the interior of the container through the wall structures of said container and case.

19. In a dispenser of the character described, a closed container for a liquid, a heat insulating case providing an enclosed space about said container, a closed receptacle for solid carbon dioxide incorporated in the container structure, said receptacle being vented into the interior of the container for releasing gaseous carbon dioxide thereinto, said receptacle being also vented into said enclosed space about said container, the venting of the gas into said space being attended with resistance to the flow thereof to keep the container constantly supplied with cooling gas under predetermined pressure for dispensing liquid therefrom, while said space is supplied with the excess gas for cooling the container exteriorly thereof.

20. In a dispenser of the character described, a heat insulating case, a liquid container housed within the case, said case providing an enclosed space above and about the sides of said container, a conduit leading through the case and container structures for tapping said container, a receptacle for solid carbon dioxide disposed within the container, said receptacle being vented to the interior of the container for releasing carbon dioxide gas thereinto and vented to the outside to release carbon dioxide gas directly above the container into the space between container and case.

GEORGE B. MARZOLF.